Nov. 21, 1967 G. SWIFT 3,354,310
MOBILE DENSITY AND MOISTURE CONTENT SENSING
DEVICE FOR CONTINUOUS LOGGING OF A
TERRESTRIAL SURFACE
Filed Oct. 14, 1963 5 Sheets-Sheet 1

INVENTOR.
GILBERT SWIFT
BY
*Russell E. Schleff*
ATTORNEY

Nov. 21, 1967                G. SWIFT                3,354,310
    MOBILE DENSITY AND MOISTURE CONTENT SENSING
         DEVICE FOR CONTINUOUS LOGGING OF A
                 TERRESTRIAL SURFACE
Filed Oct. 14, 1963                              5 Sheets-Sheet 5

FIG.11

INVENTOR.
GILBERT SWIFT
BY
ATTORNEY

United States Patent Office 3,354,310
Patented Nov. 21, 1967

3,354,310
A MOBILE DENSITY AND MOISTURE CONTENT SENSING DEVICE FOR CONTINUOUS LOGGING OF A TERRESTRIAL SURFACE
Gilbert Swift, Houston, Tex., assignor to Dresser Industries, Inc., Dallas, Tex., a corporation of Delaware
Filed Oct. 14, 1963, Ser. No. 315,901
17 Claims. (Cl. 250—83.3)

This invention relates to apparatus and method for determining the characteristics of terrestrial surface areas, and more particularly to improvements in a novel method and mobile apparatus for continuously measuring and recording the moisture content and density thereof.

There are many fields of construction wherein it is desirable and necessary to determine the moisture content and density of materials contained in substantially large surface and subsurface areas. In highway construction, dam construction, airfield runway construction and the like, it is considered essential to determine the moisture content and density characteristics of the various materials which have been used during the actual construction thereof and in particular at various stages of completion thereof. In the usual construction of highways, for example, the roadbed or subgrade is constructed and compacted to the elevations set out in the plans and specifications. A subbase course of suitable soil or gravel is applied and compacted. Then one or more base courses of gravel or crushed stone are applied and compacted before the surface course is applied. Each of these courses must be tested to determine the moisture content and density prior to the depositing of the next succeeding course. These measurements are relied upon by State Highway Department engineers as being a determining factor in judging the adequacy of the construction; therefore, such measurements should reflect, not only the overall general condition of the area, but also as complete an examination as possible to reflect abnormalities of small specific extent.

The methods in wide-spread use today for testing of roadbeds during the construction of the roadways are generally static, wherein a series of selected, independent, sample testings are made. One common method of determining the moisture content and density is to cut into the roadbed or course and remove cores therefrom. These cores are weighed; baked to dry out the material and remove the moisture therefrom; and subsequently reweighed to establish the differences in weight of the two measurements in order to determine the moisture content of the material. In order to determine the density of the material being tested, the weight of the material is divided by the volume of the cavity from which the core was removed. Two ways of determining the original volume are to fill the cavity with sand, or to place a balloon in the cavity and fill it with water. Of course, throughout an extensive roadway project it is necessary to remove many cores at various locations in order that the test results adequately represent the state of the roadway. It is obvious that these methods are time consuming and not fully reliable since the number of samples tested is rather limited with respect to the overall area under observation and, therefore, cannot truly reflect the condition of all specific areas.

A more recent advancement in the testing of roadway construction is the utilization of nuclear methods for the determination of moisture content and density of surface layers. Belcher et al. Patent No. 2,781,485, issued Feb. 12, 1957, entitled, "Methods and Apparatus for Determination of Characteristics of Matter in a Surface Layer," discloses a device for performing such a method. The Belcher patent discloses a combined radioactive source and detector which is placed in intimate contact with the surface of the material to be tested. The material is exposed to direct radiation from the radioactive source and the back scattered radiation from the material is measured at the detector. A suitable source of gamma radiation is utilized in the determination of density, and a suitable source of neutron emission is utilized in the determination of moisture content. This method is still a static type however, and consists of selected sample readings taken by placing the unit in intimate contact with the material at a plurality of selected positions and correlating the plurality of readings in an effort to establish an overall characteristic for the area being tested. In this respect, the static nuclear measuring method is similar to the more common coring method previously described. Thus, the adequacy of the representation of the testing is dependent upon the number of sample readings taken with respect to the size of the area being surveyed, and as a result is unreliable in determining the condition of any specific section unless by chance such section was actually tested.

Swift et al., in co-pending application, S.N. 192,475, entitled, "Method of Terrestrial Surveying," filed May 4, 1962, describes method and mobile apparatus for making a continuous measurement of various characteristics of roadways and recording such measurements to provide a permanent record of the surface traversed. The present invention is directed to improvements for the moisture content and density phase disclosed in said application.

While highway construction engineers require moisture content and density measurements to be made of the various courses of the roadbed, actually the desired characteristic is dry density. However, since the moisture content of any subsurface area is a variable, it is customary to determine the moisture content and subtract it from the bulk density to obtain the dry density. Therefore, while it may be ideal to have apparatus which would provide a direct measurement of dry density, the people responsible for highway construction are accustomed to dealing with the moisture content and density measurements obtained separately. Also, since moisture content and density are subject to change with time, it is necessary that the moisture content and density characteristics of the layer under consideration be obtained at essentially the same time in order to combine them meaningfully. Since the mobile nuclear method employs two sensing devices, each comprising a radiation source and a detector, the two devices cannot be too close together or radiations may be received by a detector which are due to the source associated with the other detector and hence not related to the particular property (moisture content or density) to which that detector is intended to respond. While this is especially true if both of the nuclear detectors are responsive to gamma rays, it is also true even though only one of the detectors is responsive to gamma rays. Accordingly, the detectors must be spaced from each other a distance so that radiations produced by the source from one sensing device will not influence the detector of the other sensing device, or at least such a distance where such interference will be held to a minimum. On the other hand, the distance between the two sensing devices cannot be too great, since if one device trails the other by too great a distance, maneuverability will be substantially reduced. It has been found that to further increase maneuverability and roadability, one sensing device may be incorporated in the vehicle which provides the motive power. The other sensing device is incorporated in a coaxial, two wheel trailer which is towed by the motive vehicle. The distance between the vehicle and the trailer is so regulated that there will be no adverse interference between detector systems and also of such distance that the trailer will not tilt every time the motive vehicle contacts an irregularity in the surface being traversed.

Accordingly, it is an object of the present invention to provide a mobile, continuous recording, nuclear, moisture content and density measuring unit in which the moisture content sensing device is spaced at an optimum distance from the density sensing device so that responses from one sensing device will not disadvantageously affect the other, while at the same time, the maneuverability of the unit will not be adversely affected.

It is another object to provide a novel method of continuously measuring the density and moisture content of a surface area and recording such measurements.

It is a further object to incorporate one of the sensing devices in the vehicle providing motive power for the unit in order to increase maneuverability and roadability.

Since the moisture sensing device is spaced from the density sensing device, one device will be surveying an area of the surface being tested at a spaced distance from the other. However, it is desirable in recording the results that the density and moisture readings which reflect the same spot not be offset on the record. Therefore, the recording pens are offset from one another a distance proportional to the sensing device separation.

It is another object to provide a permanent, continuous log having moisture content and density curves reflecting measurement of the same location on the surface at corresponding locations along the log.

As disclosed in the aforesaid Swift et al. application, it was found that in order to make mobile, continuous measurements there must be an air gap between the layer being tested and the sensing device. It is an important object of the present invention to provide means to maintain this air gap as constant as possible throughout the testing operation so that variations in air gap will be minimized and will not adversely affect the results.

As mentioned before, it is desirable to maintain the air gap with the greatest degree of constancy practical. While in principle, the gap can be monitored and a servomechanism used to constantly maintain the gap, or the gap can be monitored and appropriate corrections applied to the recording, it has been determined that as a practical matter, it is better to so design the apparatus as to minimize the degree to which the gap varies. In order to accomplish this, the sensing device is placed so that the longest axis of the surface area of the material influencing the measurement is positioned transversely of the roadway being tested since the surface elevation variations are found to be more consistent in a direction transverse to the road than in the longitudinal direction. Also, the sensing device is centered between a pair of coaxial wheels which have their support spaced a considerable distance away. By using such construction, the sensing device will closely follow the contour of the roadway and the air gap will tend to be constantly maintained.

It has also been found desirable to mount the sensing device midway between the wheels in the vertical plane through the axles. With such construction, the separation between the device and surface being tested will tend to remain constant.

To further aid in maintaining a constant air gap, the carrier for the sensing device is springless; therefore, the sensing device will again follow the surface being tested and separation between device and surface will tend to be constant. Further, the carrier, fore and aft, is made as small as possible consistent with making good measurements standing still. Such construction will minimize the washboard effect of the roadway since the area being sensed will not be so great that when the carrier is on the crest of a bump the air gap between the sensing device and the surface will vary over too great a range.

To further maintain air gap constancy, a soft tire is used so that the tangenial length of the tire in contact with the surface is commensurate with the length of the carrier. This is beneficial for two reasons; one, due to the wave effect of the road, a length of tire contact commensurate with the length of the carrier is needed to keep the gap constant over the length of influence; two, since the particles making up the roadway are often granular in nature, a soft tire is desirable so that the vertical distance between the sensing device and the layer reflects the true average distance and not the distance from the tops of the particles. However, probably the greatest factor in avoiding the effects caused by variation of the air gap is to have a recording system which integrates the measurement over a period of time so that what is being recorded is an average of the material and the air gap which has existed over a chosen finite interval along the traverse.

Accordingly, it is another object of this invention to provide a continuous recording, mobile moisture content and density measuring unit in which the air gap between the layer being measured and the sensing device is maintained as constant as practical during operation.

It is a further object to minimize the effect of air gap variations by integrating the measurements over a period of time so that the variation in air gap is averaged out. Accordingly, the gap can undergo short-time variations without affecting the result, provided only that the average gap during the time-constant interval remains substantially constant.

Another object is to mount the sensing device in a springless, coaxial, two wheel vehicle supported at a spaced distance from the rear of the vehicle so that the sensing device will reflect the same vertical movement as the vehicle itself.

A further object is to mount the sensing device midway between the wheels in the vertical plane of the axis of the wheels so that the air gap is maintained consistent with the contact of the wheels and the effect of the longitudinal washboard condition of the surface and transverse irregularities contacted by only one wheel are minimized.

A still further object is to make the sensing device as small as possible in the longitudinal direction, consistent with making a good static measurement, so that the longitudinal washboard effect of the surface being measured will be minimized.

A still further object is to use tires having a tangential length in contact with the surface commensurate with the length of the sensing device so that the effect of longitudinal waviness of the surface being measured is minimized as well as the minimization of the effects due to granular nature of the surface.

As previously mentioned, it is desirable to have two separate devices, one for measuring moisture content and the other for measuring density. Due to the type and strength of the source being used in the density sensing device and the shielding necessary for such source, the density measuring device is much heavier than the moisture content sensing device. One of the primary uses for the unit of the present invention is to measure the moisture content and density of new highway construction. Moisture content and density can be measured by the new unit in much less time than is customarily possible with the units of the previous art, and in order to make full utilization of the unit, it is desirable that the unit be roadable; that is, it be transportable by its own power from one location to another. Also, the unit must be maneuverable when in operation, since it will run the length of the roadway being tested and will then turn around and possibly run another test spaced from the first test. Since it is most difficult to turn a vehicle towing two trailers, it was decided to incorporate one of the sensing devices into the vehicle itself. In view of the fact that the density sensing device is extremely heavy, this device has been incorporated into the vehicle itself. It is incorporated in a hydraulically operated carrier which is so supported that at all times the plane of the density sensing device is parallel to the roadway. The carrier is so mounted that the density sensing device will swing out of the way if the carrier of the density sensing device strikes any protruding object located on a course that is being measured. In keeping with the objects previously set forth relating to the maintaining of a constant air gap the density sensing device is centerly mounted in the plane of the axis of the rear wheels and there are no springs in the rear portion of the vehicle. As previously mentioned, in order to reduce interference between the devices, the two devices are spaced apart a considerable distance. This spacing has another benefit, since the tow bar for the trailing device will be of considerable length so that the trailing device will not tilt appreciably fore and aft each time the rear wheels of the motive vehicle rise or fall due to unevenness of the surface. Therefore, the device will tend to stay parallel to the surface and provide more consistent readings.

Accordingly, it is another object to incorporate the density sensing device into the vehicle used to provide motive power for the unit.

It is a further object to have the density unit mounted by a linkage in the vertical plane through the axis of the springless rear wheels of the vehicle whereby the density sensing device will be parallel at all times and the air gap between the sensing device and the surface being tested will be maintained constant.

It is a still further object to have one of the sensing devices in a trailer having two coaxial wheels, which is spaced from its support by a sufficient distance so that the trailer will not tilt in response to waviness in the road.

Inasmuch as the unit is operated by human beings, it is necessary to take extreme precaution to prevent any possibility of radiation hazards. Therefore, the density source is heavily shielded and mounted in the rear of the vehicle to maintain it at a maximum distance from the operating personnel.

To further minimize radiation hazard to operating personnel, a neutron source having a minimum of gamma radiation has been selected. However, the moisture measurements would be very adversely affected by any neutron moderating material placed in the vicinity of the neutron source during operation. Therefore, to minimize the exposure to operating personnel (driver) to neutrons, the moisture content sensing device with neutron source is placed further from the driver than the density unit. When not in operation, the neutron source is placed in a shielded container in the rear portion of the vehicle. To further keep unauthorized personnel away from the moisture content sensing device unit, a protective, open mesh, umbrella-like structure, forming a protective anti-personnel barrier, is provided which surrounds the moisture content sensing device.

Another object is to space the gamma ray source and neutron source at an adequate distance from the operating personnel in keeping with the strength of the respective sources, together with the permissible amount of shielding.

A further object is to provide a protective anti-personnel barrier surrounding the moisture content detection device.

The respective courses of roadways may be formed of a variety of materials having different chemical compositions; however, the parameter which is desired is density and not chemical composition. Accordingly, a collimated gamma ray source is used which will direct its rays downward, and a discriminating detector, properly spaced from the source, is utilized to eliminate unwanted gamma rays whereby the chemical effect is virtually eliminated and the readings reflect density.

It is an object to use a collimated source and discriminating detector properly spaced to reflect density and to minimize the effects of chemical composition.

The moisture content sensing device of the present invention comprises a neutron source, which is substantially gamma free, and suitable neutron detectors, mounted in spaced relationship to the neutron source. The device has been so designed that a considerable amount of surface roughness can be tolerated without sacrifice of reliability and accuracy of the moisture determination. However, since no neutron source is completely gamma free and detectors are in very close proximity, it is desirable to surround the neutron source with a gamma suppressing shield so the gamma radiation emitted will not adversely affect the neutron detectors.

Another object of the invention is to provide a moisture content sensing device which utilizes a source emitting principally neutrons with a minimum of gamma radiation, and which is provided with a gamma shield to further prevent adverse effects.

A still further object is to provide a density sensing device having a collimated, shielded gamma ray source and having a spaced discriminating gamma detector which eliminates unwanted radiation whereby the results reflect density rather than chemical composition, and a spaced moisture content sensing device having a gamma shielded neutron source and spaced neutron detectors whereby gamma rays from the density source and the unwanted gammas from the neutron source do not affect the neutron detector.

The novel features of the present invention are set forth in particularity in the appended claims. The present invention, both as to its organization and manner of operation, together with other objects and advantages thereof, may best be understood by way of illustration and example of certain embodiments when taken in conjunction with the accompanying drawings in which:

Density and moisture content are important parameters in compaction control of subgrade, subbase and base roadbed layers, and are commonly specified in construction contracts. As previously mentioned, conventional methods of measuring density and moisture content are time-consuming and require that samples be taken of the road materials. In situ determinations of the density and moisture content can be obtained by using nuclear devices. As pointed out, Belcher Patent 2,781,453 discloses a portable nuclear meter which can be used to make static measurements at separate points; however, in making static measurements, it is subject to the shortcomings of the conventional method of measuring; i.e., the results only reflect the overall condition and do not pinpoint small specific abnormalities. The mobile logging system of the aforesaid Swift et al. application, S.N. 192,475, discloses a method of making continuous measurements of various characteristics (including nuclear) over relatively large areas, providing a permanent record available for future reference and diagnosis of failure.

The nuclear method for determining the density and moisture content characteristics of a surface layer of material comprises exposing the layer to be measured to direct radiation from a radioactive source placed in proximity with the layer and measuring scattered radiation from such layer at a position outside the layer. For determining density, the radioactive source used is one capable of emitting gamma radiation and the sensing means includes a detector for measuring the back-scattered gamma rays. For determining the moisture content of the hydrogenous material in the layer, the radioactive source is one capable of emitting fast neutrons and the sensing device includes a detector for scattered slow neutrons. The method of density determination is based on the fact that, in passing through matter, gamma rays are scattered by the electrons of the substance or substances encountered. The gamma rays from the source penetrate the soil mass, interact with the electrons of the material and scatter it in all directions. Some of the gamma rays are scattered toward the detector and are attenuated in number due to absorption by the material being tested. The attenuation factor is given by exp. $(-\mu\rho x)$, where $\mu$ is the mass absorption coefficient and $\rho$ the density of the material, and $x$ is the average distance traversed by the gamma rays in the material. The number of gamma rays reaching the detector is therefore inversely related to the density of the material. Suitable calibration curves permit a determination of density.

The method of determining the moisture content of the hydrogenous matter is based essentially on the fact that fast neutrons are scattered and slowed down more strongly by hydrogenous substances than by substances containing only heavier atoms. The means for carrying out this measurement comprises a fast neutron source and one or more appropriate detectors. Fast neutrons from the source enter the material and are reduced in energy by elastic collisions with the nuclei. The rate of slowing down of the neutrons is directly related to the scattering cross-section of the elements, which is the probability of occurrence of a collision, and is inversely related to the mass of the nuclei. Hydrogen has the lightest nucleus and a scattering cross-section, which increases with decreasing neutron energy, and is generally higher than that of the other elements present. The intensity of slow neutrons which reach the detector is therefore an indication of hydrogen content. By means of a suitable calibration curve, the moisture content may be determined. The number of slow neutrons detected by the detector is a measure of the hydrogenous content and again a calibration curve can be determined to show the moisture content.

Figure 1:
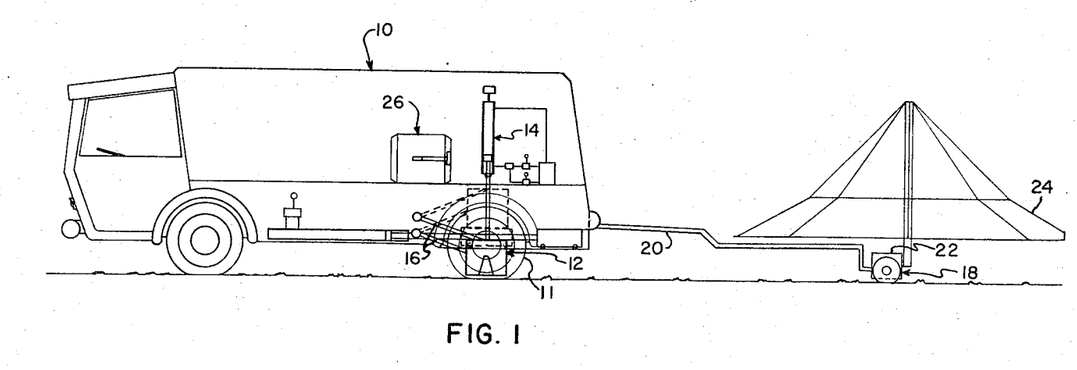
FIG. 1 is a diagrammatic elevational view of the density and moisture content measuring unit of the present invention.
Figure 2:
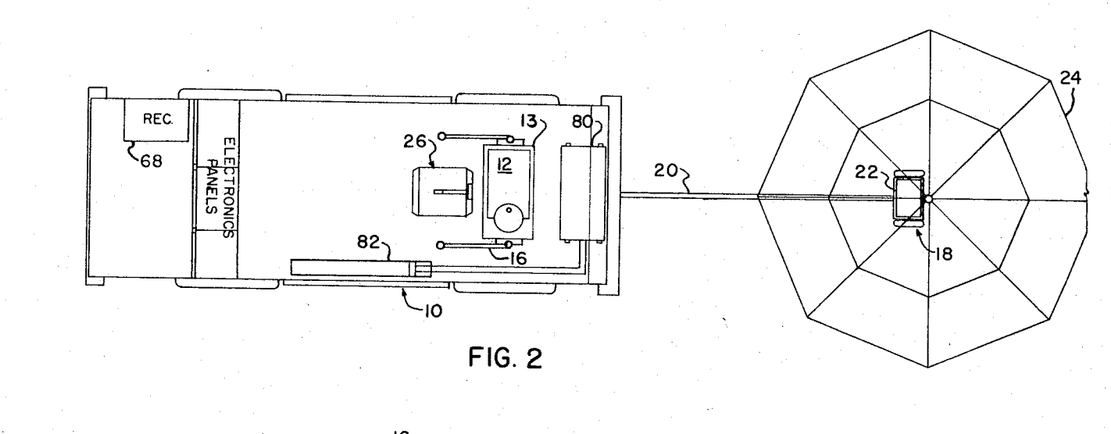
FIG. 2 is a diagrammatic view of the unit shown in FIG. 1.

Referring now to the drawings, in particular to FIG. 1, there is shown a vehicle or truck 10 which is provided with source of power such as a diesel engine. While the vehicle 10 is designed for highway travel so that it may move by its own power from one location to another, it is also provided with a special hydraulic transmission system which will permit relatively slow speeds; i.e., ½ to 3 m.p.h. during logging operations. To provide a constant source of power during logging operations, the vehicle is provided with a governor which will maintain the engine at a constant r.p.m. An alternator driven by the engine provides the constant source of power. During logging operations, while the engine speed is maintained constant the speed of the vehicle is controlled by the transmission system which drives the vehicle 10 through the front wheels. While the foregoing vehicle has been found satisfactory, other vehicles which are capable of selectively slow speeds and provide a constant source of power may be used. The two coaxial rear wheels 11 are each independently, springlessly connected to the frame of the vehicle 10. Inasmuch as there is no connecting axle between the rear wheels 11, there is provided a clear space in the rear portion of the truck 10 where a density sensing device 12, mounted in a carrier 13, is located centered between the rear wheels 11 in the plane through the axis of the rear wheels 11. Since it has been determined that roadways in particular are more wavy along the length of the roadway than in the transverse direction, it is desirable to mount the sensing device 12 so that the longest effective axis of the device influencing measurement is aligned with the axis of the rear wheels 11 whereby the adverse effects of longitudinal waviness will be minimized. Inasmuch as the rear wheels 11 are springlessly mounted, the density sensing device 12 will tend to directly respond to the contact of the rear wheels 11 and a more uniform measurement will result.

To facilitate raising and lowering of the density sensing device 12 a hydraulic system 14 is provided. In order that the density sensing device 12 will remain parallel with the surface being surveyed, the carrier 13 for the density sensing device 12 is pivotally connected to the frame of the truck by two pairs of parallel bars 16, which are angularly disposed when the density sensing device 12 is lowered to its operating position. By being so mounted, the density sensing device 12 will swing out of the way if it strikes any protruding object located on the surface being traversed, thereby preventing damage to the density sensing device 12. However, since the density sensing device 12 will not swing out of the way when the vehicle 10 is going in reverse, the device 12 should be raised whenever the vehicle 10 is reversed.

Figure 5:
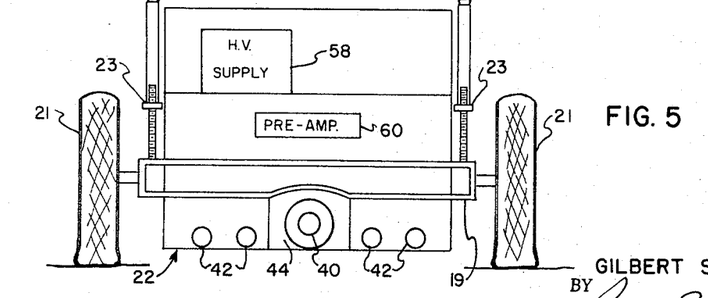
FIG. 5 is a diagrammatic elevational view of the trailer and moisture content sensing unit.

Positioned behind the vehicle 10 is a trailer 18 comprised of a frame 19 and having two coaxial wheels 21. The trailer is connected to the rear of the vehicle 10 by a tow bar 20. Centrally mounted in the frame 19 of the two-wheel trailer 18 in the plane through the axis of the wheels 21 of the trailer 18 is a moisture content sensing device 22. As mentioned in connection with the density sensing device 12, it is desirable to mount the moisture content sensing device 22 with the longest effective axis of the moisture content sensing device 22 aligned with the axis of the wheels 21 of the trailer 18. The frame 19 of the trailer 18 is provided with leveling adjustment means 23 so that the moisture content sensing device 22 can be positioned exactly parallel with the horizontal plane of the surface, even though the frame of the trailer itself may be somewhat out of parallel. As can be seen, the wheels 21 are connected to frame 19 of the trailer 18 without the intervention of springs. As can be seen in FIG. 1, an open-meshed, foldable, anti-personnel barrier 24 surrounds the trailer 18 to prevent unauthorized personnel from coming too close to the moisture sensing device 22. By being open mesh, the barrier 24 will permit wind to go through it and will prevent the trailer 18 from being overturned by wind. When the moisture content sensing device 22 is being transported from one location to another, the tow bar 20 is removed and the tow bar 20, trailer 18 and foldable barrier 24 are stored in the rear portion of the vehicle 10. The vehicle 10 contains a large shielded storage member 26 for storage of the neutron source from the moisture sensing device 22 during transport and when otherwise not in use. The complete unit is designed to be operated by one man and is maneuverable in the most restricted areas with a turn around radius of approximately 17 feet.

As can be seen, the trailer 18 for the moisture sensing device 22 is spaced a considerable distance from the rear of the vehicle 10. Therefore, the trailer 18, and more importantly the moisture content sensing device 22, will not tilt appreciably each time the rear wheels 11 of the vehicle 10 hit an irregularity in the surface being traversed and the moisture sensing device 22 will tend to stay parallel to the surface and provide more consistent readings as will be explained subsequently.

As mentioned, it is desirable that the moisture content sensing device 22 remain parallel with the surface being traversed. In addition to spacing the trailer 18 a considerable distance from the rear of the vehicle 10 and having a long wheel base for the vehicle 10, the wheels of the vehicle 10 and the trailer 18 are provided with extremely soft tires. Having soft tires is beneficial for two reasons. First, due to the wave effect of roadways, it is desirable that the tires have a length of the contact commensurate with the length of the sensing device so that the gap between the bottom of the sensing device and the surface being traversed tends to remain constant throughout its length. Also, in going over surface irregularities, the variation in air gap, averaged over the effective area of the sensing device, will tend to be more nearly constant than would be the case if wheels making point contact with the roadway were employed. Second, most courses of roadways are granular in nature and if hard tires are used the unit would tend to ride on the top of the granular surface, resulting in inaccurate readings due to the increased air gap. Furthermore, when the sensing device approaches an abrupt rise in the level of the surface the wheels, having a long contact area will begin to rise before the leading edge of the sensing device arrives at this point. Accordingly, the sensing device seldom strikes the roadway material. On the other hand, if hard tires with limited length of contact were employed, the device would strike the material much more frequently.

Figure 3:
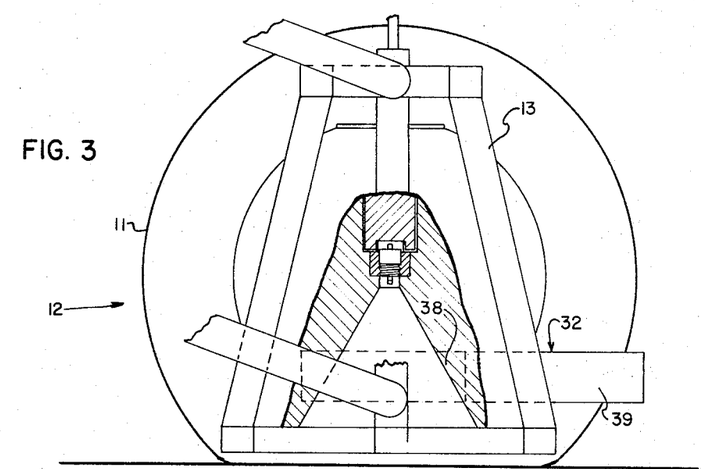
FIG. 3 is a diagrammatic side view of the density sensing unit.
Figure 4:
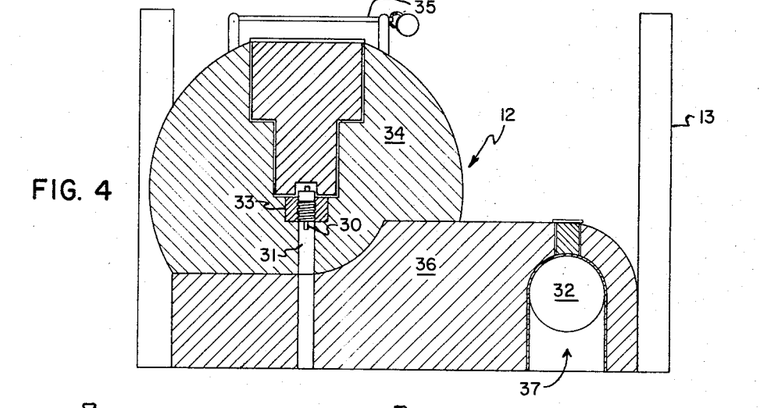
FIG. 4 is a sectional view of the density unit shown in FIG. 3.

Turning now to the density sensing device 12, attention is directed to FIGS. 3 and 4. The density sensing device 12 primarily is comprised of a gamma ray source 30, consisting of 500 millicuries of cobalt 60, and a shielded scintillation detector 32, mounted in fixed relationship to the source 30. The gamma ray source 30 is mounted in a slot 31 in approximately the center of a large spherical shield 34 of lead. The slot 31 has an insert 33 of more dense and more machineable material to provide a receptacle for the source 30. A locked cover 35 prevents unauthorized access to the source 30. Between the source 30 and cover 35 is a removable block of lead which permits access to the source 30. The heavy lead shield 34 prevents direct transmission of the gamma rays from the source 30 to the detector 32 which is also mounted in a lead shield 36, having a window 37. Gamma rays from the source are constrained to approach the roadway surface through the collimating slot 31, which can be seen in FIGS. 3 and 4. The slot 31 in one direction is a narrow passage, and in the other direction is wedge shaped; thus, the gamma rays penetrate the surface essentially normal thereto and are scattered in all directions by collision with atomic electrons. The window 37 in the detector shield 36 permits detection by the scintillation detector 32. As previously mentioned, the longer effective axis of the density sensing device 12 is mounted in line with the axis of the rear wheels 11 of the vehicle 10. The other axis, i.e., the axis running normal to the axis of the wheels 11 is made as small as possible consistent with making a good measurement while the apparatus is standing still. Therefore, since the surfaces generally have more waviness in a longitudinal direction, there is less length of the air gap and hence less variation of gap than if the axis in a longitudinal direction was of large magnitude. Accordingly, the device is disposed such that its source is positioned laterally from its detector.

The scintillation detector 32 is comprised of a large sodium iodide, thallium activated crystal 38, and a rugged vibration resistant photomultiplier tube 39. In addition to gamma ray shielding, there is provided highly effective magnetic shielding to eliminate the adverse effects of various magnetic intensities encountered in moving from place to place.

Although, in order to assure good density measurements, the source 30 is relatively large, the hazard to personnel working in the vicinity is negligible. The heavy shielding 34 provides for safe working conditions with the operator normally eight feet or more away from the source.

Inasmuch as the density measurement sought is one which is substantially independent of the chemical composition of the material being measured, it has been found that by the use of gamma ray sources having an energy level between 1.0 mev. and 2 mev. the chemical effects on the density response are very small, if not completely negligible. The chemical insensitivity is further enhanced by discriminating against gamma rays with energies less than 200 kev. By using energy discriminating in this manner, it is practical to use a single density calibration curve for all conventional materials used in highway construction.

The moisture sensing device 22, which is located in trailer 18, is comprised of a five-curie, plutonium-beryllium neutron source 40, which emits approximately $8 \times 10^6$ neutrons per second. This source 40 was chosen because it is essentially gamma-free. Accordingly, its radiation hazard to operating personnel is minimized. Disposed on either side of source 40 are two boron $-10$ enriched $BF_3$ proportional counters 42, which are primarily sensitive to thermal neutrons. While the $BF_3$ counters 42 will not count gamma rays, a large gamma ray flux will take up the time of the counter and partially inactivate it as to receiving thermal neutrons. Therefore, since every neutron source will emit some gammas, there is provided a lead shield 44 between the plutonium-beryllium source 40 and the $BF_3$ detectors 42. This lead shield 44 will sufficiently attenuate gamma rays, but will not appreciably attenuate the fast neutrons. As previously mentioned, since the moisture measurements would be very adversely affected by any neutron moderating material placed in the vicinity of the neutron source during operation, the moisture content sensing device 22 is positioned farther from the driver than the density sensing device 12. Accordingly, as can be seen in FIG. 1, the moisture content sensing device 22 is located in the trailer 18, which is spaced to the rear of the vehicle 10. Also, as previously pointed out, in order to keep unauthorized personnel away from the neutron source 40, an open-meshed, anti-personnel barrier 24 is placed around the trailer 18.

While the density sensing device 12 utilizes a gamma ray source 30 and a gamma-ray-detecting scintillation counter 32 and the moisture content sensing device 22 uses a virtually gamma-free neutron source 40 and neutron detectors $BF_3$ counters 42; nevertheless, the detectors could be adversely affected from the radiation of the other source. As mentioned in connection with the neutron detector 42 stray gamma rays from the neutron source 40 could utilize detecting time of the $BF_3$ counters 42 and although the counters 42 would not count these gamma rays they would disable the $BF_3$ counters 42 and they would not be able to properly count neutrons. Therefore, it is essential that the two sensing devices 12 and 22 be spaced from each other a predetermined distance so that the radiations produced by the source from one device will not adversely influence the other device or at least be spaced a distance whereby such interference will be held to a minimum. It has been found that 10 feet is a preferable distance. Using such a distance any interference is held to a minimum and the distance between the rear of the vehicle 10 and the trailer 18 is not such as to adversely affect maneuverability.

Belcher Patent 2,781,453 discloses placing the source and detector in intimate contact with the material to be measured. Theoretically, this condition is very desirable since the radiation will then directly enter the material being tested and also the scattered radiation will be from such material. In setting about to develop a mobile continuous recording device, an attempt was made to sled the sensing units in direct contact with the surface; however, it was found that, due to the inherent characteristics of the surfaces of road courses and the waviness thereof, while at one moment the device would be in intimate contact with the surface being surveyed, the next moment there would be a substantial air gap between the surface and the sensing device. Also, it was found that, in sledding, the device would normally be riding on the crest of the granular materials forming the subbase. This resulted in erratic and erroneous readings. Accordingly, it was found that in order to have consistently accurate readings it was best to have a constant air gap between the surface being surveyed and the instrument. It has been found that an air gap of one inch provides a satisfactory spacing because the irregularities of the surfaces encountered in practice very rarely protrude more than one inch, and it is desirable to maintain the spacing between the sensing device and the surface at a practical minimum.

Figure 6:
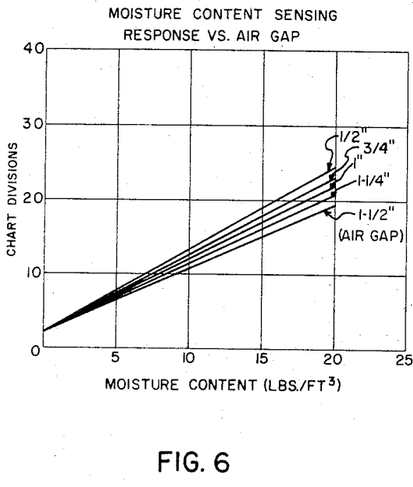
FIG. 6 is a chart illustrating the changes in moisture content response resulting from change in air gap.

FIG. 6 shows the changes in the recorder deflection as the air gap between the moisture content sensing device 22 and the road surface is varied. For example, a variation of ±¼ inch in the air gap will cause an error of approximately 5 percent in the reading. The design of the moisture content trailer 18 is such that variations in air gap seldom exceed ⅛ inch for any appreciable interval of time. Therefore, the effects of air gap variation on the moisture content log are relatively small and generally tend to average out due to the time constant in the detecting system.

Figure 7:
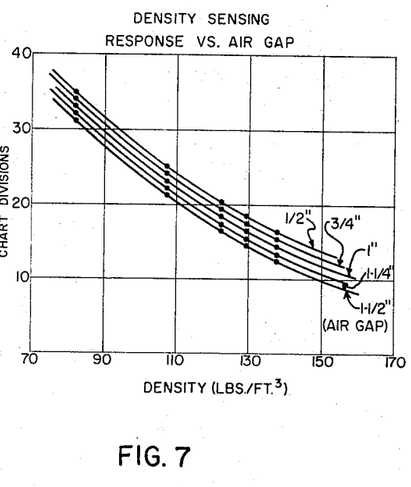
FIG. 7 is a chart illustrating the change in density response resulting from change in air gap.

FIG. 7 shows the changes in the counting rate as the air gap, or stand-off between the density sensing device 12 and the road surface, is varied. As is evident from FIG. 7, a variation of ±⅛ inch from the standard one inch air gap produces a variation in the density measurement of about ±1.5 lbs./ft.$^3$ at all densities. The error produced by variations in the air gap bought about by ordinary departures from flatness of the surface is, therefore, small and of the order of 1–2 percent. Primarily, the insensitivity of the system to air gap variations is due to the geometry and collimation of the gamma ray source and the detector and to the energy discrimination.

Figure 8:
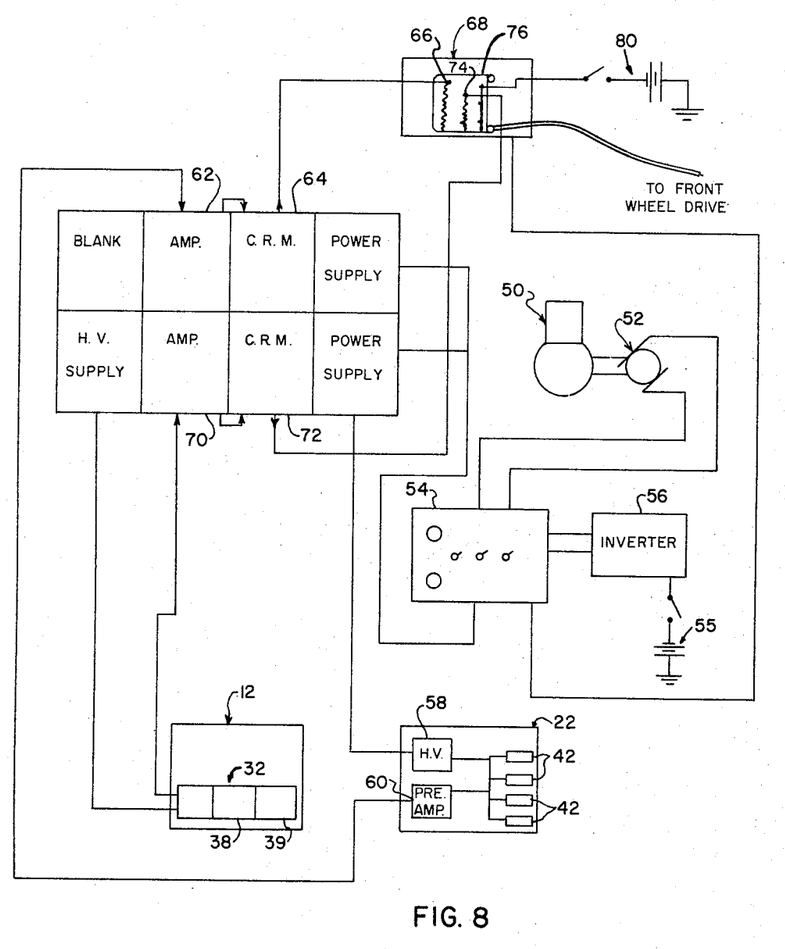
FIG. 8 is a schematic of the electronic system of the unit.

FIG. 8 is a schematic of the electronic system of the density and moisture content sensing unit. As previously mentioned, the vehicle 10 is provided with a diesel engine 50 which is equipped with a governor to maintain its speed at a definite r.p.m. during logging operations. The engine drives an alternator 52 which puts out 120 volt, 60 cycle, A.C. current. This current is delivered to a power panel 54 having buses for connection of the electronic equipment of the unit. In addition, the 12 volt battery 55 in the vehicle 10 is connected to an inverter 56 which will put out 120 volt, 60 cycle, A.C. current. This current is also supplied to the power panel 54. Since the engine speed is not constant during transport of the vehicle 10 to the location where it will commence operation, the current from the inverter 56 is generally used to warm up the various elements that require pre-warming. The constant current from the alternator 52 is used during logging operation. The power panel is provided with the necessary switches and receptacles to permit connecting the electronic gear into the inverter supply for warmup, or to the alternator supply for use during logging. The moisture content sensing device 22 is provided with a power supply 58, which will energize the BF$_3$ detectors 42. The signals generated by the detectors 42 flow into a preamplifier 60, which is also located in the moisture content sensing device 22. The amplified pulses are then transported by cable to an amplitude discriminating pulse amplifier 62 contained in the vehicle 10. After amplification, and predetermined discrimination, to eliminate pulses produced by radiations other than slow neutrons, the remaining pulses are transmitted to a count rate meter 64, having a time constant, which integrates the signal over a finite period of time. The resulting electrical current is transmitted to one pen 66 of a two-channel recorder 68.

Figure 11:
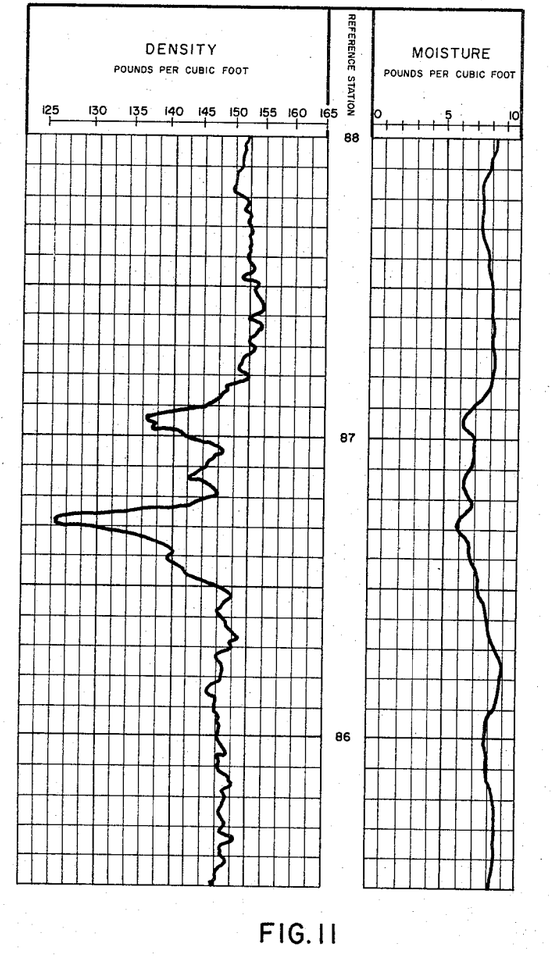
FIG. 11 is a reproduction of a log produced by the unit of the present invention.

As mentioned, the density sensing unit 12 uses a scintillation counter, having crystal 38 and photomultiplier tube 39. Power from the alternator 52 supplies power to the detector 32 through a high voltage power supply module and the signal from detector 32 is transmitted back to an amplitude discriminating pulse amplifier 70 which eliminates signals of an energy less than 200 kev. The signal is then transmitted to a count rate meter 72, where it is integrated. The final signal is transmitted to the other pen 74 of the two-channel recorder 68. The two-channel recorder 68 thus records the radiation intensities encountered by the respective detectors on a chart 76, which is driven during logging operation in synchronization with the travel of the front wheels of the vehicle. A sample of the log produced is shown in FIG. 11. Inasmuch as the moisture content sensing unit 22 trails the density sensing unit 12, and it is desirable to have the readings appropriately located on the record, the pen for the one unit is offset with respect to the other so that they are recording information which reflects the condition of the same surface being surveyed in the same point along the distance axis of the chart. Accordingly, measurements made at the same bench mark on the surface traversed will appear at the same chart location even though one device was trailing the other; see the two traces in FIG. 11. The count rate meters have an adjustable time constant of from ½ to 5 seconds. Therefore, when adjusted to 3 seconds, operating the vehicle at a speed of one mile per hour provides averaging over a length of 4.4 ft. The use of the time consonant serves to average out the effects of variations in air gap due to surface roughness and mechanical oscillation. The effect of the exponential time consonant does not preclude seeing anomalies which extend a shorter distance than that given by the product of time consonant and logging speed.

Deflections due to such anomalies will be rounded off at their peaks or valleys, as their case may be, if they are substantially shorter in extent. The recorder 68 may be provided with means 80 which may be manually actuated by the operator to indicate special conditions occurring during logging operations.

The improved method of the present invention for continuously and in effect simultaneously determining the density and moisture content of material in an area comprises traversing the area with a nuclear density sensing device spaced at a predetermined distance above the surface, traversing the same area with a nuclear moisture content sensing device spaced at a predetermined distance above the surface at a predetermined spacing from the density sensing device, the spacing being such that the radiation from one device does not adversely affect the other device, continuously detecting the responses of said sensing devices, and continuously recording the detected responses from such devices on a chart with the responses from each device representing the same bench mark of the area surveyed correspondingly displaced along the axis of the chart.

Figure 9:
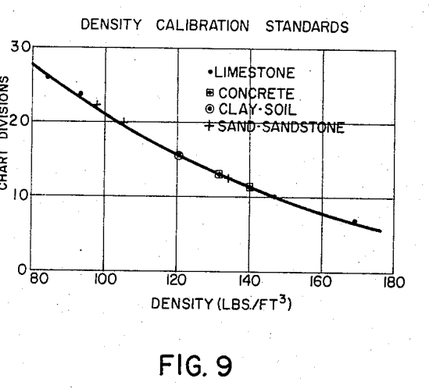
FIG. 9 is a chart illustrating the calibration curve for the density sensing device.

As previously mentioned, the density sensing device and moisture content device have been calibrated to produce calibration curves. The calibration curve for the density sensing device 12 is shown in FIG. 9, wherein the response curve of observed recorded deflection vs. density is shown. Points for the curve were determined from measurements of large laboratory samples consisting of limestone blocks and gravel, sandstone blocks and sand, soil and concrete.

The curve of recorder deflection vs. density is reasonably linear in the range of interest, as can be seen from FIG. 9. However, to permit more accurate readings of density values, non-linear scales have been developed for interpretation of the log. Specified sensitivity settings of the count rate meter permit calibration of the recorder for density ranges from either 90–140 lbs./ft.$^3$ or 125–165 lbs./ft.$^3$. Other ranges may be established if desired.

Field calibration of the density sensing device is accomplished by measurement of a standard limestone block 80 of known density. As can be seen in FIG. 1, the standard block 80 is carried in the rear portion of the vehicle 10 and is connected to a hydraulic system 82, which will move the block 80 to a position under the raised density sensing unit 12 for the purposes of field calibration. Also, during transport the calibration block 80 is located directly under the density sensing unit 12 and therefore the gamma rays from the source 30 in the density sensing device 12 which are transmitted outward of the vehicle 10 are considerably diminished.

Figure 10:
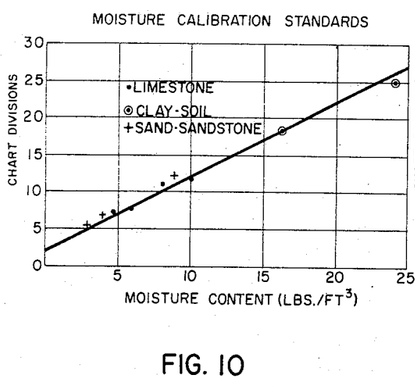
FIG. 10 is a chart illustrating the calibration curve for the moisture content sensing device.

In like manner the moisture content sensing device has been calibrated. FIG. 10 shows the result of this calibration. Most points on this curve were obtained from laboratory mixtures of limestone gravel, sand, and soil with water. The samples were packed to various densities; water content of the mixtures was determined by oven drying of the samples. The curve is substantially linear with the moisture content in the range of interest. Field calibration of the moisture content sensing unit is established by placing a device which results in a standard deflection at a closely spaced position with respect to the moisture sensing device, with the devices lifted away from other nearby materials.

As can be seen from the foregoing, the improved mobile moisture content and density measuring unit will provide a continuous measuring and recording of the moisture content and density of a surface being surveyed. The density sensing device and moisture content sensing device are spaced a small predetermined distance above the surface and spaced a predetermined distance from each other so that the radiations from one device will not adversely affect the other device, and irregularities of the surface are averaged out and minimized. Moreover, the unit is so designed that it measures the parameters desired (moisture content and density) of various materials without being adversely affected by the chemical compositions of such materials. Further, it provides a permanent record, see FIG. 11, which can be used later for diagnosis.

As mentioned, static methods of obtaining moisture content and density as a rule make measurements no closer than 500 feet. However, the present unit makes a continuous measurement and therefore will uncover anomalies in specific areas which would likely be missed by the static methods. For example, an anomaly can be noted in FIG. 11, which is a reproduction of an actual log, which would in all likelihood have been missed by selected measurements. Even though the moisture content sensing device trails the density sensing device, provisions are made so that the finished log produces logs which correspondingly reflect measurements made at the same bench mark along the surface being surveyed.

While the preferred form of the invention has been shown, it is understood that various changes may be made in its construction by those skilled in the art without departing from the scope of the invention as defined in the appended claims.

I claim:

1. A mobile unit for logging a terrestrial surface to determine the moisture content and density thereof, said unit comprising:

a front wheel drive land vehicle having a pair of coaxial rear wheels, each rear wheel being independently, springlessly attached to the frame of the vehicle;

a nuclear density sensing device mounted in the vehicle;

pivotally attached pairs of parallel bars in the rear portion of the vehicle, the nuclear density sensing device attached to the pivotally attached parallel pairs, and centered between the wheels in the plane of the axles of the rear wheels, the longest effective axis of the nuclear density sensing device aligned with the axis of the axle, said density sensing unit positioned within the vehicle during transport;

means in the vehicle attached to the density sensing device to lower the density sensing device a small spaced vertical distance above the terrestrial surface during the logging operation;

the pivotally attached parallel bars maintaining the density sensing device substantially parallel to the terrestrial surface being traversed;

a coaxial two wheeled trailer spaced from the rear of the vehicle;

a nuclear moisture content sensing device mounted in the trailer in the plane of the axles of the wheels with the longest effective axis aligned with the axles;

tires on the rear wheels of the vehicle and tires on the trailer having an area of contact commensurate with the effective longitudinal axis of the sensing devices;

a rigid tow bar attaching the trailer to the rear of the vehicle thereby spacing the trailer a predetermined distance from the rear of the vehicle;

the spacing between the vehicle and the trailer minimizing adverse radiation effects from either device; and means to continuously determine and record the responses from the two devices.

2. A mobile unit for logging a terrestrial surface to determine the moisture content and density thereof, said unit comprising:

a self-propelled land vehicle;

a first nuclear sensing device mounted in the rear portion of the vehicle, pivotally attached parallel bars having one end mounted in the rear of the vehicle and the other end attached to the first nuclear sensing device whereby during logging operations the first nuclear sensing device is spaced a small vertical distance above the terrestrial surface;

the pivotally attached parallel bars maintaining said first nuclear sensing device substantially parallel to the terrestrial surface being traversed;

a trailer having a coaxial pair of wheels spaced from the rear of the vehicle;

a second nuclear sensing device mounted in the trailer in the plane of the axis of the coaxial wheels and spaced a small vertical distance above the terrestrial surfaces;

one of said nuclear sensing devices being sensitive to density and the other being sensitive to moisture content;

rigid means attaching the trailer to the rear of the vehicle spacing the trailer a predetermined longitudinal distance from the rear of the vehicle;

the spacing between the vehicle and trailer being of such a longitudinal distance that the radiation from either device will not adversely affect the other device.

3. The unit specified in claim 2 characterized in that the wheels under the sensing device are provided with tires that have an area of contact with the surface commensurate with the longitudinal axis of their respective sensing devices whereby the vertical spacing of the sensing devices from the terrestrial surface is relatively uniform.

4. A mobile unit for logging a terrestrial surface to determine the moisture content and density thereof, said unit comprising:

a self-propelled land vehicle;

a first nuclear sensing device mounted from the vehicle, spaced a small vertical distance above the terrestrial surface;

mobile means spaced a predetermined longitudinal distance from the rear of said vehicle;

a second nuclear sensing device mounted on the mobile means and spaced a small vertical distance above the terrestrial surface;

means attaching the mobile means to the rear of the vehicle; one of said nuclear sensing devices being sensitive to density and the other nuclear sensing device being sensitive to moisture content;

the spacing between the density sensing device and moisture content sensing device being of such a longitudinal distance that the radiation from either device will not adversely affect the other device;

means for continuously determining the responses from the density sensing device and moisture content sensing device; and means for continuously recording said determined responses.

5. The unit specified in claim 4 characterized in that it has surface contacting means having an area of contact commensurate with the effective length of the sensing devices whereby the vertical spacing of the devices above the terrestrial surface is uniform throughout their effective length.

6. The unit specified in claim 4 characterized in that it has means in the determining means for averaging the responses over a finite period of traverse to average out any irregularities.

7. A mobile unit for logging a terrestrial surface to determine the moisture content and density thereof, said unit comprising:
a self propelled land vehicle;
a first nuclear sensing device pivotally mounted from the rear portion of the vehicle, centered between a pair of wheels and in the plane of the axles of said wheels, and having its longest effective axis aligned with the axles and a small spaced vertical distance above the terrestrial surface during logging operation;
the pivotally attaching means for the said first nuclear sensing device maintaining the first nuclear sensing device parallel to the terrestrial surface being traversed;
a trailer having two coaxial wheels longitudinally spaced from the rear of the vehicle;
a second nuclear sensing device mounted in the trailer in the plane of the axis, of the coaxial wheels with the longest effective axis of the second nuclear sensing device aligned with the axles of said wheels, and spaced a small vertical distance above the terrestrial surface;
one of said nuclear sensing devices being sensitive to density and the other being sensitive to moisture content;
rigid means attaching the trailer to the rear of the vehicle, spacing the trailer a predetermined longitudinal distance from the rear of the vehicle;
the spacing between the vehicle and trailer being of such a distance that the radiation from either device will not adversely affect the other device whereby irregularities in the surface being contacted by the rear wheels of the vehicle will not cause the trailer to tilt;
means for continuously determining the responses from said devices; and
means for continuously recording said determined responses.

8. The unit specified in claim 4 characterized in that it has means in the determining means of the density sensing device to eliminate responses under a predetermined level.

9. The unit specified in claim 4 characterized in that it has means in the recording means whereby the record produced will reflect responses from common bench marks at the same point along the axis.

10. A mobile unit for logging a terrestrial surface to determine the moisture content and density thereof, said unit comprising:
a nuclear density sensing device spaced a small vertical distance above the terrestrial surfaces;
a nuclear moisture content sensing device spaced a small vertical distance above the terrestrial surface;
means spacing the nuclear moisture content sensing device a predetermined longitudinal distance from the nuclear density sensing device;
the longitudinal spacing between the nuclear density sensing device and nuclear moisture content sensing device minimizing radiation from either device adversely affecting the other device:
means to propel the mobile unit along the surface being logged; and
means to continuously determine and record the responses from the nuclear density sensing device and the nuclear moisture content sensing device.

11. The unit specified in claim 4 characterized in that the nuclear density sensing device is comprised of a gamma ray source and a gamma ray detector and the moisture content sensing device is comprised of a neutron source and neutron detectors.

12. The unit specified in claim 9 characterized in that it is provided with a two channel strip chart recorder having offset pens whereby measurements made at corresponding bench marks will be produced at corresponding chart divisions.

13. The unit specified in claim 11 characterized in that the nuclear moisture sensing device has a neutron source and spaced neutron counters with a gamma suppressing shield between the source and detectors to eliminate unwanted gammas.

14. A mobile nuclear measuring unit for logging a terrestrial surface comprising:
a self propelled land vehicle;
a nuclear sensing device pivotally mounted in the rear portion of the vehicle;
said nuclear sensing unit positioned within the vehicle during transport;
means lowering the nuclear sensing unit to a small spaced vertical distance above the terrestrial surface during logging operations;
means in the vehicle attached to the nuclear sensing device facilitating raising and lowering the nuclear sensing device;
the pivotal mounting means for the nuclear sensing device being formed of two pairs of parallel bars, one pair on each side of the nuclear sensing device, the ends of bars in the vehicle being pivotally attached thereto and the ends of the bars on the nuclear sensing device being pivotally attached thereto whereby the nuclear sensing device will be maintained parallel to the terrestrial surface benig traversed and will swing upward upon contacting a protruding object in the terrestrial surface when in logging position; and
means to continuously measure and record the responses of the nuclear sensing device.

15. The method of continuously and in effect simultaneously determining the density and moisture content of materials in a terrestrial area comprising:
traversing the terrestrial area with a nuclear density sensing device spaced at a predetermined vertical distance above the surface of the terrestrial area;
simultaneously traversing the same area with a nuclear moisture content sensing device spaced at a predetermined vertical distance above the surface of the terrestrial area and at a predetermined longitudinal distance from said density sensing device, the longitudinal spacing being of such a distance that the radiation from one device will not adversely affect the other device;
maintaining said sensing devices spaced at a predetermined distance above the surface of the terrestrial area during radiation and detection;
continuously detecting the measurements from said devices; and
continuously recording said measurements.

16. The unit specified in claim 4 characterized in that the first nuclear sensing device mounted from the vehicle is pivotally attached to the vehicle by two pairs of parallel bars, one pair on each side of the nuclear sensing device whereby the nuclear sensing device will be maintained parallel to the terrestrial surface being traversed and will swing upward upon contacting a protruding object.

17. The method specified in claim 15 characterized in that the continuously recording of the measurements from both of said devices are on a chart forming two logs in which the measurements from the same bench marks in the terrestrial area are correspondingly displaced along the axis of the chart.

References Cited

UNITED STATES PATENTS

| 2,675,482 | 4/1954 | Brunton | 250—83.3 |
| 2,712,609 | 7/1955 | Herzog et al. | 250—83.6 |
| 2,781,453 | 2/1957 | Belcher et al. | 250—83.6 |
| 3,123,168 | 3/1964 | Atwood | 152—9 X |
| 3,124,690 | 3/1964 | Savin | 250—106 |
| 3,176,134 | 3/1965 | Wright | 250—83.3 |

RALPH G. NILSON, *Primary Examiner.*

WALTER STOLWEIN, *Examiner.*

S. ELBAUM, *Assistant Examiner.*